United States Patent [19]
Yeh

[11] Patent Number: 6,036,416
[45] Date of Patent: Mar. 14, 2000

[54] APPARATUS FOR DRIVING A CUTTER HOLDER IN A MACHINING TOOL

[76] Inventor: Heng-Tsan Yeh, No. 246, Sec. 2, Chang-Hsin Rd., Ho-Mei Chen, Chuan-Hua Hsien, Taiwan

[21] Appl. No.: 09/121,564

[22] Filed: Jul. 23, 1998

[51] Int. Cl.⁷ .............................. B23C 5/26; B23Q 3/12; B23B 29/12
[52] U.S. Cl. ........................ 409/233; 408/239 R
[58] Field of Search ................... 409/233, 232, 409/231, 234; 408/239 R

[56] References Cited

U.S. PATENT DOCUMENTS

| | | | |
|---|---|---|---|
| 3,424,055 | 1/1969 | Rollat | 409/233 |
| 3,468,552 | 9/1969 | Nardone | 409/233 X |
| 3,481,248 | 12/1969 | Engstrom | 409/233 |
| 5,018,916 | 5/1991 | Bauch | 409/233 |

Primary Examiner—William Briggs
Attorney, Agent, or Firm—Pitney, Hardin, Kipp & Szuch, LLP

[57] ABSTRACT

An apparatus for driving a cutter holder in a machining tool include, a sleeve, a holder carrying rod, a cylinder body unit, a piston rod, and a spring unit. The sleeve and the cylinder body unit are adapted to be disposed on a machine bed, and are spaced apart from each other. The holder carrying rod is movable axially and reciprocally in the sleeve, and is adapted to carry the cutter holder thereon. The piston rod is aligned with the holder carrying rod, and can be activated to reciprocate in the cylinder body unit. When the piston rod moves forward in the cylinder body unit, it impels the holder carrying rod to move forward in the sleeve. When the piston rod moves rearward in the cylinder body unit, a spring unit biases the holder carrying rod to move rearward toward the piston rod. A tongue unit is mounted fixedly on the front end of the cylinder body unit, and engages an annular groove in the sleeve, thereby preventing axial movement of the sleeve relative to the cylinder body unit.

2 Claims, 6 Drawing Sheets

APPARATUS FOR DRIVING A CUTTER HOLDER IN A MACHINING TOOL

BACKGROUND OF THE INVENTION

1. Field of the Invention

This invention relates to a machining tool, more particularly to an apparatus for driving a cutter holder in a machining tool.

2. Description of the Related Art

Referring to FIGS. 1 and 2, a conventional apparatus for driving a cutter holder in a numerical control machining tool is shown to include a sleeve 11, a holder carrying rod 12, a cutter holder 13, a cylinder body unit 14, and a piston rod 15. The sleeve 11 and the cylinder body unit 14 are adapted to be disposed on a machine bed 10. The holder carrying rod 12 is journalled on a bearing unit 111 in the sleeve 11, and is biased by a spring unit 112 to move toward a front end of the piston rod 15. Accordingly, the holder carrying rod 12 can reciprocate in the sleeve 11. When the cutter holder 13 moves in the sleeve 11 rearward toward the cylinder body unit 14, it holds a cutter (not shown) thereon. When the cutter holder 13 moves in the sleeve 11 forward away from the cylinder body unit 14, it releases the cutter (not shown) therefrom. When the piston rod 15 moves forward in the cylinder body unit 14 to contact the holder carrying rod 12, a forward thrust is applied to the bearing unit 111. As a result, the holder carrying rod 12 cannot reciprocate in the sleeve 11 smoothly. In addition, the parts in the sleeve 11 are liable to be damaged.

SUMMARY OF THE INVENTION

The object of this invention is to provide an apparatus for driving a cutter holder in a machining tool in which a sleeve engages a cylinder body unit, thereby permitting smooth movement of a holder carrying rod in the sleeve and minimizing damage to the parts in the sleeve upon impact of a piston rod on the holder carrying rod.

According to this invention, an apparatus for driving a cutter holder in a machining tool includes a sleeve, a holder carrying rod, a cylinder body unit, a piston rod, and a spring unit. The sleeve and the cylinder body unit are adapted to be disposed on a machine bed, and are spaced apart from each other. The holder carrying rod is movable axially and reciprocally in the sleeve, and is adapted to carry the cutter holder thereon. The piston rod is aligned with the holder carrying rod, and can be activated to reciprocate in the cylinder body unit. When the piston rod moves forward in the cylinder body unit, it impels the holder carrying rod to move forward in the sleeve. When the piston rod moves rearward in the cylinder body unit, a spring unit biases the holder carrying rod to move toward the piston rod. A tongue unit is mounted fixedly on the front end of the cylinder body unit, and engages an annular groove in the sleeve, thereby preventing axial movement of the sleeve relative to the cylinder body unit. Because the sleeve is held on the cylinder body unit due to engagement of the tongue unit within the annular groove, the holder carrying rod can move smoothly in the sleeve. Furthermore, damage to the parts in the sleeve is minimized.

BRIEF DESCRIPTION OF THE DRAWINGS

Other features and advantages of this invention will become apparent in the following detailed description of the preferred embodiment of this invention, with reference to the accompanying drawings, in which.

DETAILED DESCRIPTION OF THE PREFERRED EMBODIMENT

Figure 1:
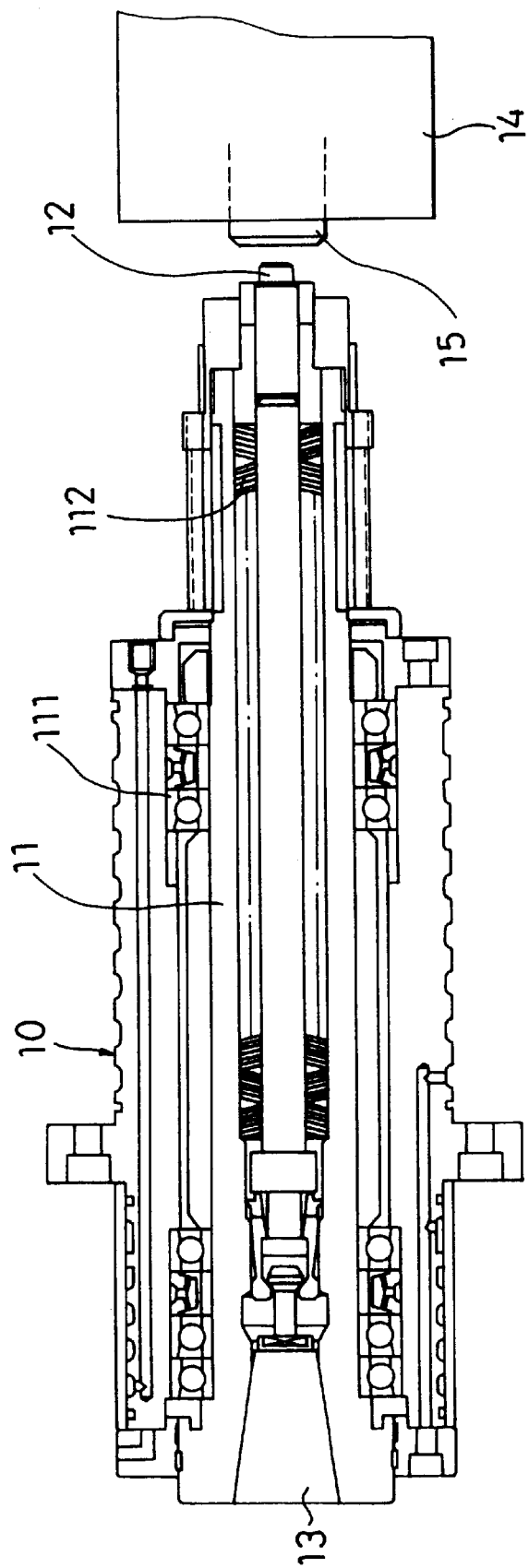
FIG. 1 is a schematic top view illustrating a conventional apparatus for driving a cutter holder in a machining tool in which a piston rod is spaced apart from a holder carrying rod.
Figure 2:
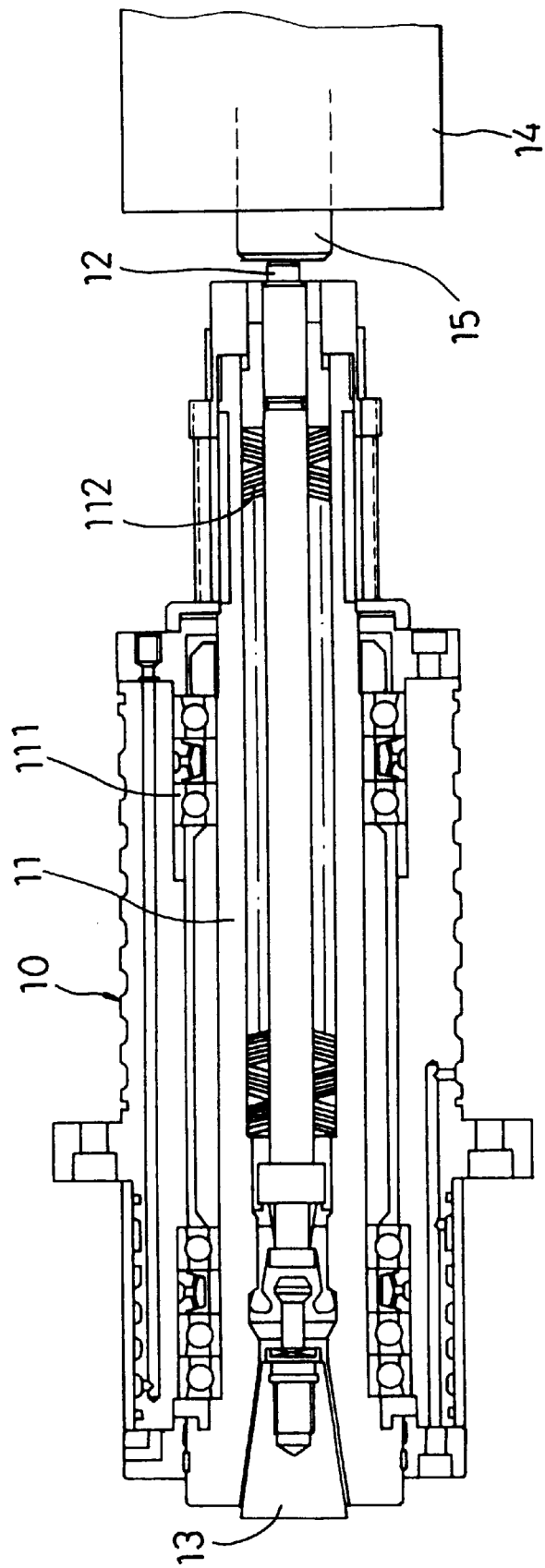
FIG. 2 illustrates the conventional apparatus of FIG. 1 in which the piston rod contacts the holder carrying rod.
Figure 3:
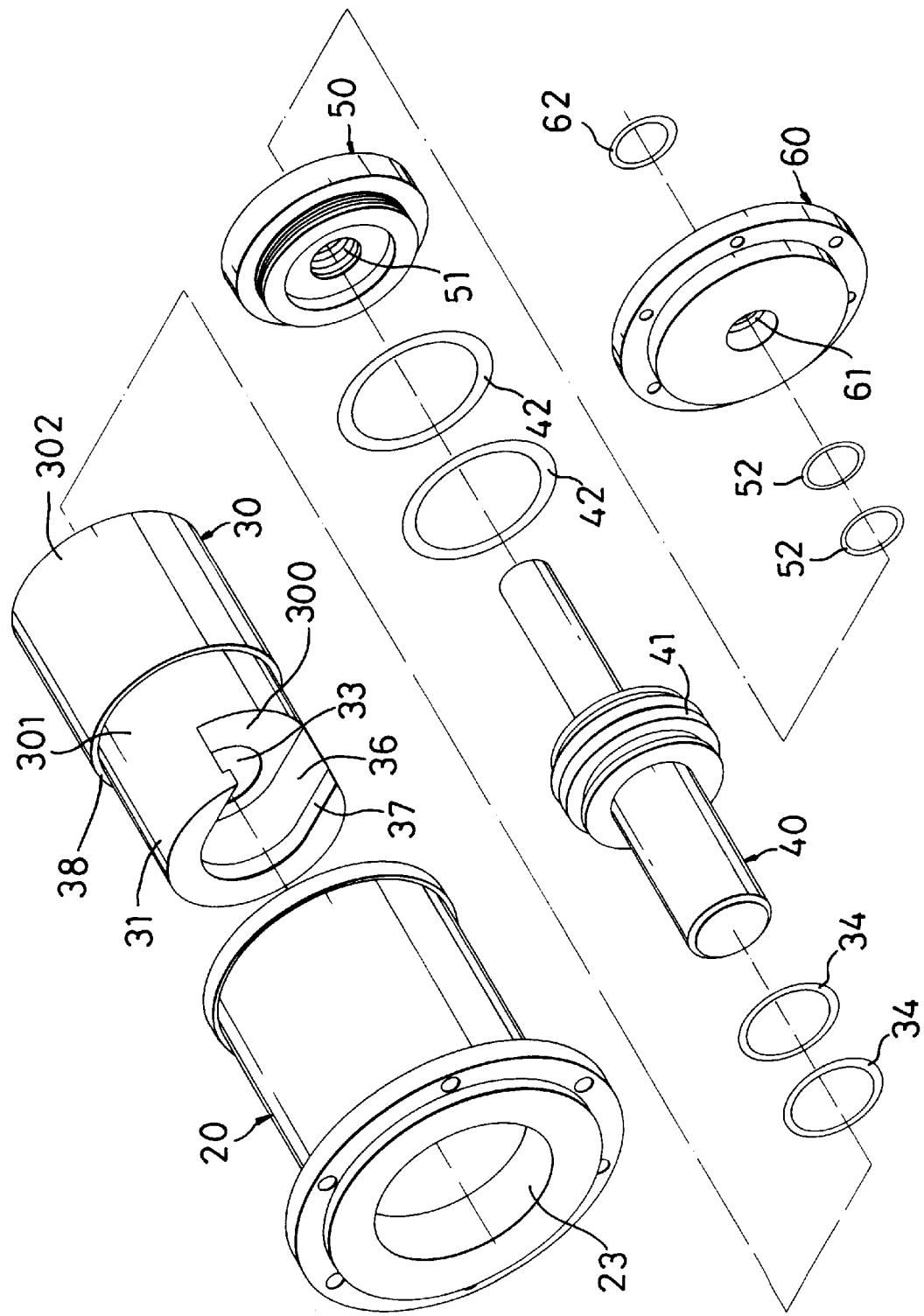
FIG. 3 is an exploded perspective view of a hydraulic cylinder unit of the preferred embodiment of an apparatus for driving a cutter holder in a machining tool according to this invention.
Figure 4:
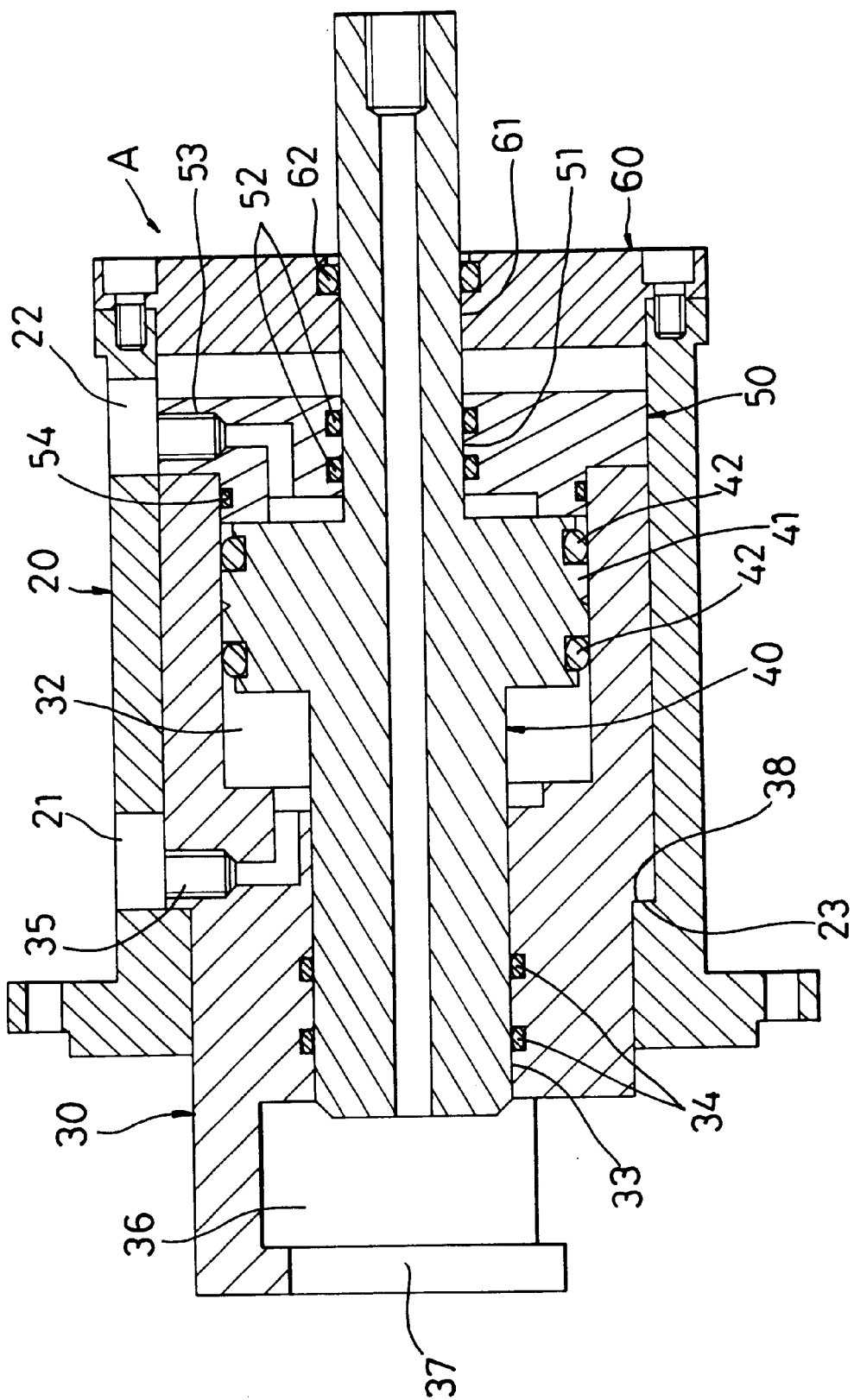
FIG. 4 is a sectional view showing the hydraulic cylinder unit of the preferred embodiment.
Figure 5:
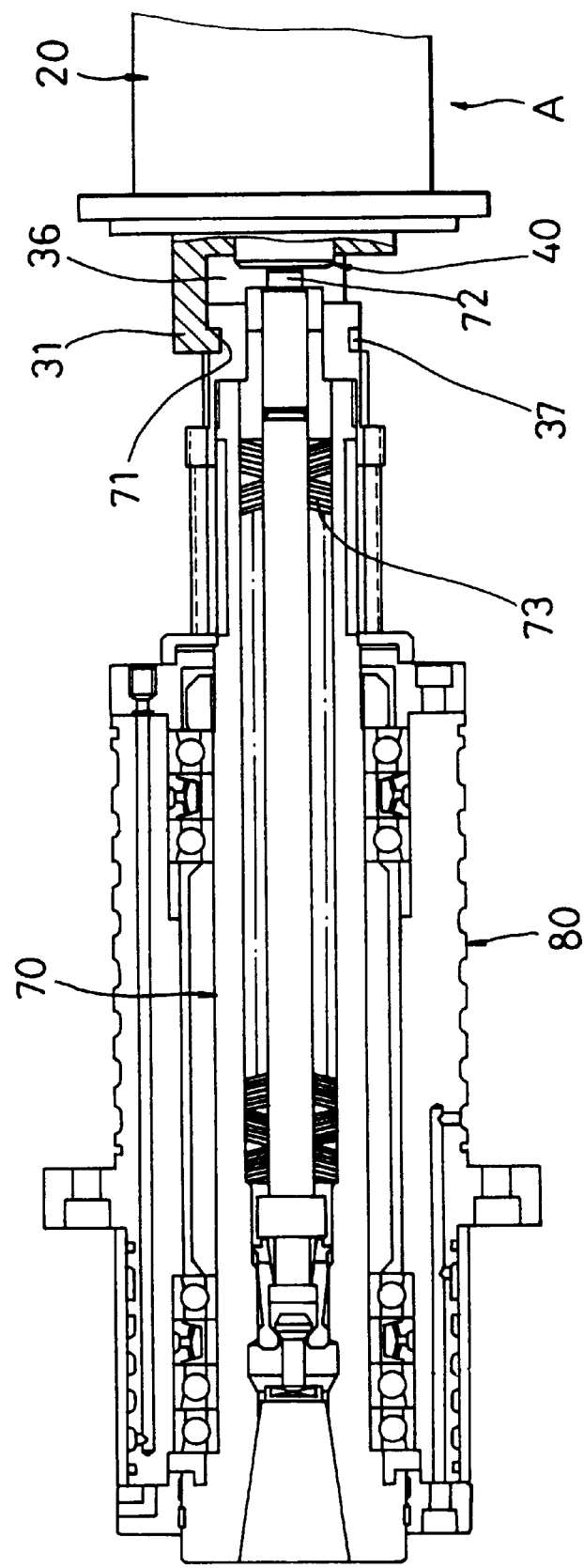
FIGS. 5 and 6 illustrate the movement of the holder carrying rod in the sleeve of the preferred embodiment.

Referring to FIGS. 3 to 5, the preferred embodiment of an apparatus for driving a cutter holder in a numerical control machining tool is shown to include a hydraulic cylinder unit (A) and a sleeve 70. The sleeve 70 (see FIG. 5) is adapted to be disposed on a machine bed 80, and has a rear end portion formed with an annular groove 71 in an outer surface thereof. A holder carrying rod 72 is journalled in the sleeve 70 in a known manner, and has a front end which is adapted to carry a cutter holder 82 thereon, and a rear end which extends from the sleeve 70. A spring unit 73 is disposed in the sleeve 70 in a known manner for biasing the holder carrying rod 72 rearward toward a piston rod 40 of the hydraulic unit (A) to a predetermined position in the sleeve 70.

The hydraulic unit (A) includes a cylinder body unit, a positioning tube 30, and the piston rod 40. The cylinder body unit has a cylinder body 20, an annular sealing member 50 formed with a central hole 51, and an annular rear cover 60 formed with a central hole 61.

The cylinder body 20 has open front and rear ends, two oil inlets 21, 22 formed through a wall thereof, and an inward flange 23 projecting radially and inwardly from a front end portion of the cylinder body 20.

The positioning tube 30 is disposed inside the cylinder body 20, and has a front end surface 300 integrally formed with a generally U-shaped front extension portion 31, a piston chamber 32, a central bore 33, two O-rings 34, a front oil passage 35, a sleeve engaging space 36, an inward flange or tongue unit 37, and a shoulder 38. The front extension portion 31 extends forward from the front end surface 300 of the positioning tube 30, and defines the sleeve engaging space 36 into which a rear end portion of the sleeve 70 is inserted. The O-rings 34 are interposed between the positioning tube 30 and a front end portion of the piston rod 40 to establish a liquid-right seal therebetween. The front oil passage 35 is in fluid communication with the front oil inlet 21 in the cylinder body 20 and the piston chamber 32. The inward flange 37 engages the annular groove 71 in the sleeve 70, thereby preventing axial movement of the sleeve 70 relative to the cylinder body 20. The shoulder 38 is defined on an outer surface of the positioning tube 30 between a small-outer-diameter front portion 301 and a large-outer-diameter rear portion 302 of the positioning tube 30. The shoulder 38 abuts against the inward flange 23 of the cylinder body 20 to prevent forward movement of the positioning tube 30 in the cylinder body 20.

The piston rod 40 extends through the positioning tube 30, the sealing member 50, and the rear cover 60, and has an intermediate portion, which is integrally formed with a piston 41. The piston 41 has an outer peripheral surface, which abuts against an inner surface of the positioning tube 30. Two O-rings 42 are interposed between the piston 41 and the positioning tube 30 to establish a liquid-tight seal therebetween.

Two O-rings 52 are interposed between the sealing member 50 and the piston rod 40. The sealing member 50 has an oil passage 53, which is in fluid communication with the rear oil inlet 22 in the cylinder body 20 and the piston chamber 32 in the positioning tube 30. An O-ring 54 (see FIG. 4) is interposed between the positioning tube 30 and the sealing member 50 to establish a liquid-tight seal therebetween.

The rear cover 60 is mounted threadedly on the cylinder body 20. An O-ring 62 is interposed between the rear cover 60 and the piston rod 40 to establish a liquid-tight seal therebetween.

Figure 6:
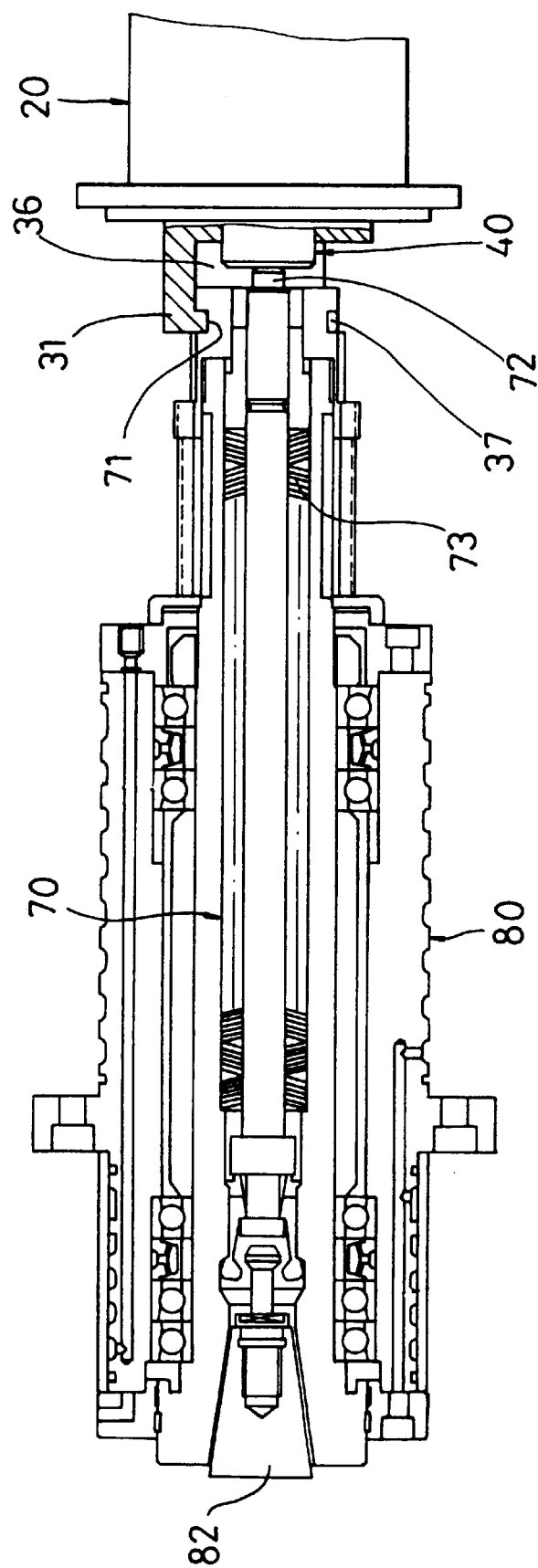

As such, when hydraulic oil is introduced into the piston chamber 32 in the positioning tube 30 via the front oil inlet 21 and the oil passage 35, the piston rod 40 moves rearward in the hydraulic cylinder unit (A). When the hydraulic oil is introduced into the piston chamber 32 in the positioning tube 30 behind the piston 41 via the rear oil inlet 22 and the oil passage 53, the piston rod 40 moves forward in the hydraulic cylinder unit (A) to the position shown in FIG. 6.

In this manner, the holder carrying rod 72 can reciprocate smoothly in the sleeve 70. It can also be appreciated that the engagement of the inward flange 37 of the positioning tube 30 within the annular groove 71 in the sleeve 70 minimizes damage to the parts in the sleeve 70 during movement of the holder carrying rod 72 in the sleeve 70.

With this invention thus explained, it is apparent that numerous modifications and variations can be made without departing from the scope and spirit of this invention. It is therefore intended that this invention be limited only as indicated in the appended claims.

I claim:

1. An apparatus for driving a cutter holder in a machining tool, the machining tool having a machine bed, said apparatus comprising:

a sleeve adapted to be disposed on the machine bed and having an outer surface formed with an annular groove;

a holder carrying rod mounted in said sleeve and movable axially and reciprocally in said sleeve, said holder carrying rod having a front end which is adapted to carry the cutter holder thereon, and a rear end which extends from said sleeve;

a hydraulic cylinder unit having a cylinder body unit which is adapted to be fixed on the machine bed and which has a front e(nd and a rear end, and a piston rod which is aligned with said holder carrying rod, said piston rod being capable of being activated to reciprocate in said cylinder body unit and having a front end which extends from said cylinder body unit toward said holder carrying rod; and a spring unit disposed on said sleeve for biasing said rear end of said holder carrying rod to move toward said front end of said piston rod;

wherein said hydraulic cylinder unit further includes:

a positioning disposed in said cylinder body unit, and having a front end surface formed with a generally U-shaped front extension portion, which extends integrally and forwardly from said front end surface and which is formed with an inward flange, said inward flange projecting radially and inwardly from said front extension portion to engage said annular groove of said sleeve; and a piston integrally formed with an intermediate portion of said piston rod and having an outer peripheral surface which abuts against an inner surface of said positioning tube in such a manner that a liquid-tight seal is established therebetween;

whereby, when hydraulic oil is introduced into said cylinder body unit behind said piston, said piston rod moves forward in said cylinder body unit; and when the hydraulic oil is introduced into said cylinder body unit in front of said piston, said piston rod moves rearward in said cylinder body unit.

2. An apparatus as claimed in claim 1, wherein said positioning tube has a front portion, and a rear portion with an outer diameter larger than that of said front portion to define a shoulder on an outer surface of said positioning tube between said front and rear portions, said cylinder body unit including a cylinder body in which said positioning tube is disposed, said cylinder body having a front end portion formed with an inward flange, which projects radially and inwardly therefrom, said shoulder of said positioning tube abutting against said inward flange of said cylinder body, thereby preventing forward movement of said positioning tube in said cylinder body.

* * * * *